United States Patent
Gripp et al.

(10) Patent No.: US 9,281,900 B2
(45) Date of Patent: Mar. 8, 2016

(54) WAVELENGTH-TUNABLE BURST-MODE RECEIVER

(71) Applicant: Alcatel-Lucent USA Inc., Murray Hill, NJ (US)

(72) Inventors: Jurgen Gripp, Westfield, NJ (US); John E Simsarian, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/320,196

(22) Filed: Jun. 30, 2014

(65) Prior Publication Data

US 2015/0381285 A1   Dec. 31, 2015

(51) Int. Cl.
  *H04B 10/06*    (2006.01)
  *H04B 10/60*    (2013.01)

(52) U.S. Cl.
  CPC ..................................... *H04B 10/60* (2013.01)

(58) Field of Classification Search
  CPC ...... H04B 10/60; H04B 10/61; H04B 10/611; H04B 10/612; H04B 10/613; H04B 10/614; H04B 10/615; H04B 10/616; H04B 10/6161; H04B 10/6162; H04B 10/6163; H04B 10/6164; H04B 10/6165; H04B 10/6166
  USPC ......... 398/202, 203, 204, 206, 205, 207, 208, 398/209, 158, 159, 147, 81, 65, 152, 79, 33, 398/135, 136, 137, 138, 139, 211, 212, 213, 398/214
  See application file for complete search history.

(56) References Cited

U.S. PATENT DOCUMENTS 7,555,227 B2 *  6/2009  Bontu et al. ................. 398/202
8,983,309 B2 *  3/2015  Harley et al. ................ 398/206

\* cited by examiner

*Primary Examiner* — Hanh Phan
(74) *Attorney, Agent, or Firm* — Andrew R. Ralston

(57) ABSTRACT

An apparatus, e.g. an optical receiver, includes an optical front end and a processor. The optical front end is configured to coherently receive an input optical signal and convert the input optical signal to a digital-electrical data stream. The processor is configured to recover a data stream from the digital-electrical data stream. The processor is further configured to compare a correlation pattern of the recovered data stream with a pre-determined correlation pattern. The processor is further configured to determine, from the comparison, coefficients of a filter configured to recover data encoded on the input digital-electrical data stream.

18 Claims, 8 Drawing Sheets

Exhibit A

Exhibit B

WAVELENGTH-TUNABLE BURST-MODE RECEIVER

TECHNICAL FIELD

The disclosure relates generally to the field of optical communication.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Metropolitan networks that use electronic packet and circuit switches for aggregation of data into optical wavelengths are inefficient due to the electronic processing of through-traffic that is not added or dropped at a node. Optical packet networks enable sub-wavelength optical bypass so that through-traffic does not consume network interface bandwidth and electronic-switch resources. The advent of coherent transmission with polarization division multiplexing (PDM) has improved the spectral efficiency of wavelength division multiplexed optical transport.

SUMMARY

One embodiment provides an apparatus, e.g. an optical receiver. The apparatus includes an optical front end and a processor. The optical front end is configured to coherently receive an input optical signal and convert the input optical signal to a digital-electrical data stream. The processor is configured to recover a data stream from the digital-electrical data stream. The processor is further configured to compare a correlation pattern of the recovered data stream with a pre-determined correlation pattern. The processor is further configured to determine, from the comparison, coefficients of a filter configured to recover data encoded on the input digital-electrical data stream.

In any embodiment of the apparatus the filter may be configured to recover DP-QPSK (dual-polarization quadrature phase-shift key) modulated data from the digital-electrical signal. In any embodiment of the apparatus the comparison may include cross-correlating first and second received complex correlation patterns with first and second pre-determined correlation patterns.

In any embodiment the optical front end may include an optical hybrid, a plurality of optical detectors and a plurality of analog-to-digital converters. When present the optical hybrid is configured to receive an input optical signal and a local oscillator signal and to produce a plurality of optical output signals corresponding to in-phase and quadrature components of the input optical signal. Each optical detector of the plurality of optical detectors is configured to convert a corresponding one of the output signals to a corresponding electrical signal. The plurality of analog-to-digital converters is configured to produce, from the outputs of the optical detectors, the digital-electrical data stream including the in-phase and quadrature components.

In some embodiments of the apparatus that include the optical front end, the local oscillator signal is configured to switch between first and second wavelengths. In some embodiments the receiver processor is further configured to reduce a relative polarization angle between the input optical signal and the local oscillator signal by increasing a measure a cross-correlation between a received correlation pattern corresponding to a first polarization channel of the input optical signal and a predetermined correlation pattern corresponding to a second polarization channel of the input optical signal. In some embodiments the correlation includes cross-correlating a first and second received complex correlation patterns with respective first and second pre-determined correlation patterns, wherein the first and second pre-determined correlation patterns correspond to about nil rotation between a polarization channel of the received optical signal and a corresponding polarization of the local oscillator. In some embodiments the receiver processor is further configured to separate two polarization data channels received via the input optical signal.

In some embodiments the receiver processor is further configured to reduce an offset frequency between the input optical signal and the local oscillator prior to the cross-correlation. In some such embodiments the receiver processor is further configured to reducing the offset frequency by determining the offset frequency during a header period during which the input optical signal is unmodulated.

Various embodiments provide methods, e.g. of configuring a receiver processor of an optical coherent receiver. In one embodiment a method includes configuring the processor to recover a data stream from an input digital-electrical data stream. The processor is further configured to correlate a correlation pattern of the data stream with a pre-determined correlation pattern. The processor is further configured to determine, from the correlation, coefficients of a filter configured to recover data encoded on the input digital-electrical data stream. Various embodiments may further include configuring the receiver processor and/or other components to effect the aforementioned embodiments.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION

The disclosure is directed to, e.g. apparatus, systems and methods for transmitting optical communications signals.

The inventors have recognized that coherent transmission PDM has made possible a network based on optical packet selection with a burst-mode coherent receiver using a wavelength tunable local oscillator (LO). Accordingly, embodiments presented herein may provide improved performance of optical receivers, e.g. by determining frequency offset, packet start time, and polarization of a coherent optical packet or burst, by reducing convergence time and singularities that may characterize some conventional equalizers.

Figure 1:
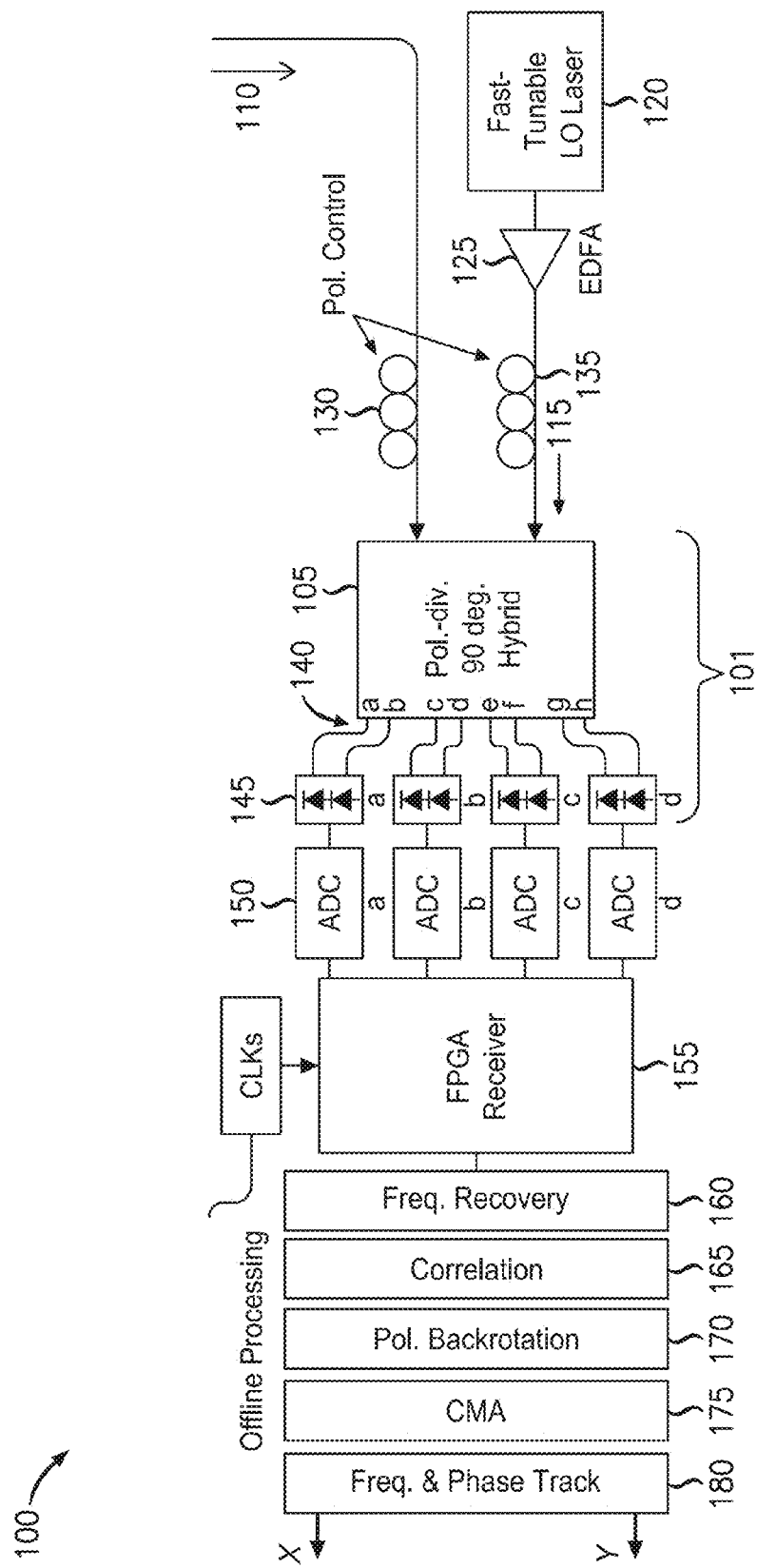
FIG. 1 illustrates a system according to one embodiment, e.g. a coherent optical receiver, including a local oscillator (LO), an optical front end and a receiver processor.

FIG. 1 illustrates an embodiment, e.g. a coherent optical receiver 100. The receiver 100 includes an optical front end 101 and a receiver processor 155. The optical front end 101 includes an optical hybrid 105 configured to receive an optical input signal 110 and a local oscillator (LO) signal 115. In various embodiments the input signal includes DP-QPSK (dual-polarization quadrature phase-shift key) modulated data, though other modulation formats may be used, e.g. DP quadrature amplitude modulation such as 8-QAM or 16-QAM. The LO signal 115 is illustrated as being generated by a laser 120 and an amplifier 125, e.g. an EDFA, though embodiments are not limited to such a configuration. In a nonlimiting example, the laser 120 is a 16-channel digitally tunable external cavity laser with narrow linewidth and having a wavelength switching time less than 10 ns. Optionally, the receiver 100 includes polarization controllers 130 and 135 to control the polarization of, respectively, the input signal 110 and the LO signal 115.

Preferably the optical hybrid 105 is polarization diverse. The optical hybrid 105 provides at outputs 140a-140h various combinations of the signals 110 and 115. The properties of optical hybrids are well-known to those skilled in the optical arts, and are thus not described in detail here. By way of example, the outputs 140a-140h may provide signal combinations $\pm(S+L)$, $\pm(S-L)$, $\pm(S+jL)$ and $\pm(S-jL)$, where S is the input signal 110, and L is the LO signal 115. The optical front end 101 also includes balanced optical detectors 145a-145d that convert the complementary outputs from the hybrid 105 to the electrical domain, with the detector outputs being received by analog-to-digital converters (ADCs) 150a-150d. The ADCs 150 convert the electrical representations to digital-electrical data streams that include in-phase (I) and quadrature (Q) components. In a nonlimiting example ADCs 150 may be 8-bit converters. The ADC 150a may output a digital representation of $I_x$; the ADC 150b may output a digital representation of $Q_x$; the ADC 150c may output a digital representation of $I_y$; and the ADC 150d may output a digital representation of $Q_y$, where the subscripts x and y refer to each of two polarization components of the received signal 110.

The processor 155, e.g. a DSP, field-programmable gate array (FPGA) or similar device, receives the digital-electrical data streams and, clocked by one or more unreferenced CLKs, provides initial processing of the received signals, as described further below. Post-processing of output from the processor 155 is provided by a frequency recovery block 160, a correlation block 165, a polarization back-rotation block 170, a constant modulus algorithm (CMA) block 175, and a frequency/phase tracking block 180. The frequency/phase tracking block 180 provides X and Y data outputs corresponding to the received polarization channels of the signal 110. The functionality of the blocks 160-180 may be implemented in a same or a different processor, e.g. a DSP or FPGA.

The receiver 100 is configured to perform constant modulus algorithm (CMA) equalization of the received signal 110. As appreciated by those skilled in the optical arts, CMA equalization is a blind equalization technique that uses a constant modulus criterion to minimize a cost function of deviations of magnitude of the equalized signal from a fixed value. Advantageously, embodiments of the receiver 100 described below and within the scope of the claims provide a rapid recovery of a signal payload by, e.g. providing improved determination of frequency offset, packet start time and/or polarization of a received coherent optical packet or burst. Moreover, such embodiments provide these improvements without additional optical carvers used in some implementations. (See, e.g. Vacondio, et al., "Real-Time implementation of packet-by-packet polarization demultiplexing in a 28 Gb/s burst mode coherent receiver", in Optical Fiber Communication Conference, OSA Technical Digest (Optical Society of America, 2012), paper OM3H.6., incorporated herein by reference.)

The LO laser 120 is configured to switch between two frequencies, $\lambda_1$ and $\lambda_2$ with a period $T_{LO}$. The optical input signal 110 may be provided via a carrier that operates continuously at $\lambda_1$ or $\lambda_2$. Data packets, e.g. internet protocol (IP) packets, from different source nodes may be encoded sequentially on $\lambda_1$ and $\lambda_2$.

Figure 2:
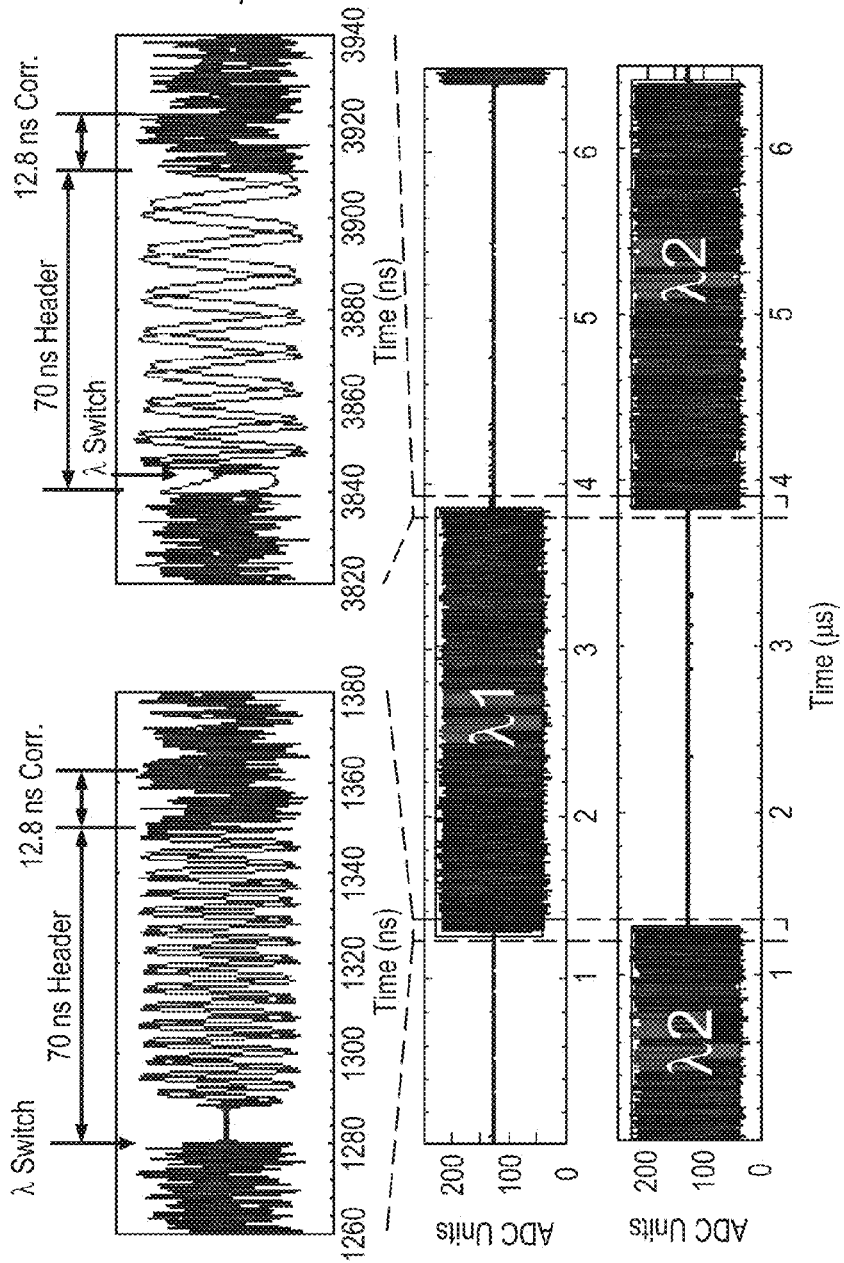
FIGS. 2A-2D illustrate example signals received by the system of FIG. 1, including different wavelengths output by the LO of FIG. 1 (FIGS. 2A and 2B), and headers, between received optical packets, in which a received optical signal is unmodulated (FIGS. 2C and 2D)

Turning to FIGS. 2A-2D, illustrated are recovered optical packets received by the receiver 100 from an optical transmitter (not shown) in a period of about 6.5 µs, in a nonlimiting experimental configuration. FIGS. 2A and 2B show the output of the ADCs 150 in ADC units, with the received signal carrier at $\lambda_2$ in FIG. 2A, and the received signal carrier at $\lambda_1$ in FIG. 2B. These figures show $\lambda_1$ and $\lambda_2$ separately for clarity, though in physical embodiments the $\lambda_1$ and $\lambda_2$ signals are conveyed by the same data path from the ADCs 150 to the processor 155. The periods during which there is no signal in FIGS. 2A and 2B are caused by the signal-LO interference having a larger frequency than the receiver bandwidth. Typically the LO laser 120 wavelength switches continuously between $\lambda_1$ and $\lambda_2$. Thus the illustrated 6.5 µs time span represents somewhat greater than one switching period $T_{LO}$ of the laser 120. It is understood that the selection of this time span is merely illustrative. In other embodiments packets may be received from more than two sources, each at a different wavelength. In such embodiments the LO laser wavelength may continuously switch among the wavelengths of each of the received packet signals. The laser 120 signal wavelength is illustrated in FIGS. 2A and 2B for clarity, wherein the FIG. 2B illustrates the ADC 150 output with the LO laser 120 outputting $\lambda_1$ from about 1.3 µs to about 3.9 µs, and FIG. 2A illustrates the ADC 150 output with the LO laser outputting $\lambda_2$ prior to about 1.3 µs and from about 3.9 µs to about 6.4 µs. For the purpose of example only, in some embodiments $\lambda_1$ is about 1554.13 nm and $\lambda_2$ is about 1555.74 nm, with a burst duration, $T_{LO}$ of 2.56 ms. During operation the $\lambda_1/\lambda_2$ signals are received via the signal 110, on which the packet wavelengths are multiplexed. Of course in other embodiments a larger number of wavelengths from different packet sources may be multiplexed.

FIG. 2C illustrates an expanded view of the received signal from 1260 ns to 1380 ns. FIG. 2D illustrates an expanded view of the received signal 110 from 3820 ns to 3940 ns. The time range of FIG. 2C spans a portion of FIGS. 2A/B in which the LO laser switches from $\lambda_2$ (e.g. 1555.74 nm) to $\lambda_1$ (e.g. 1554.13 nm). The time range of FIG. 2D spans a portion of FIGS. 2A/2B in which the LO laser switches from $\lambda_1$ to $\lambda_2$. During each transition, the received signal includes a header portion lasting, e.g. about 70 ns following the wavelength switch. Each transition also includes, following the header portion, a correlation portion lasting, e.g. about 12.8 ns following the header portion. During the header between optical packets, all of the modulator components are held on one of the QPSK symbols for 70 ns.

In the currently described embodiment, during the header periods all of the received signal components are set to one of the QPSK symbols. Within a short time after the end of each packet data period, e.g. about 10 ns or less, in some embodiments about 6 ns, the wavelength of the LO signal 115 begins switching, and the remainder of the header time is used to recover and track the offset frequency between the received signal carrier (the optical input signal 110) and the LO signal 115.

Each packet contains a first block of symbols, e.g. a correlation block. The first block forms two complex correlation patterns, one for each polarization of the input signal 110, the correlation patterns preferably being distinct from each other. In this context, "complex" refers to values that include magnitude and phase. In the illustrated embodiment the packets consist of segments of four $2^{15}-1$ pseudo-random bit sequences (PRBS). The segments in $Q_x$, $I_y$, and $Q_y$ are shifted relative to $I_x$ by 24576, 4096, and 20480 bits, respectively. The first 64 symbols of each payload form two distinct complex correlation patterns $CL_x$ and $CL_y$, e.g. first and second pre-determined correlations patterns, one for each X and Y polarization.

Referring back to FIG. 1 and as described further below, the receiver 100 performs, e.g. in the correlation block 165, four complex cross-correlations, $C_{xx}$, and $C_{xy}$, $C_{yx}$, and $C_{yy}$, between the received data and two pre-calculated correlation patterns that correspond to a system with no polarization rotation. For example, $C_{xy}$ is the cross correlation of the complex received x signal from the digital receiver with an expected y-polarization sequence.

Figure 3:
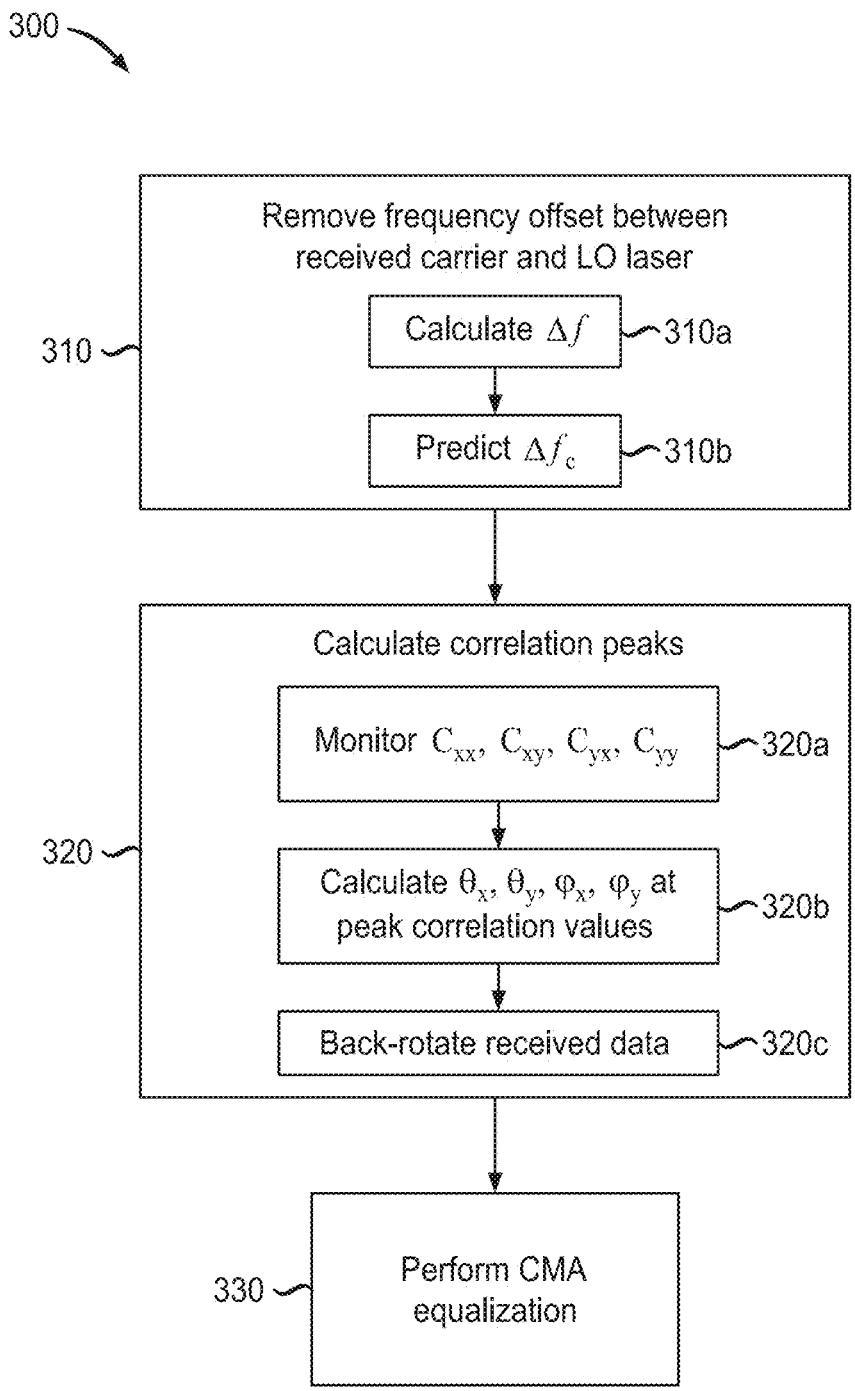
FIG. 3 illustrates steps of a method that may be performed in the correlation process of various embodiments.

Turning to FIG. 3, steps of a method 300 are shown. The method 300 may be performed by the receiver processor 155 in various embodiments to recover the data packets conveyed by the input signal 110, including performing the aforementioned cross-correlation.

Figure 4:
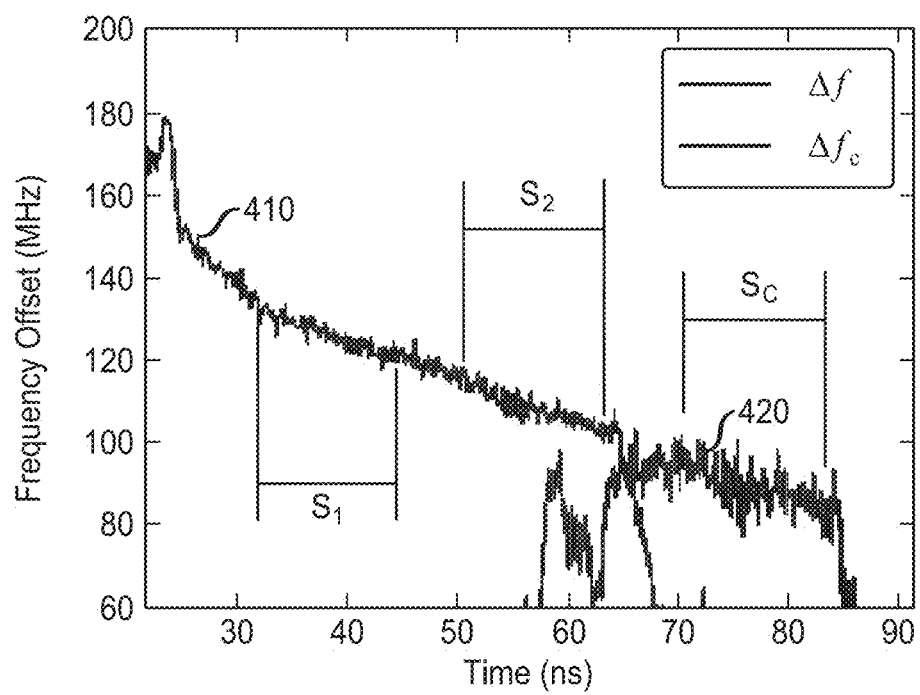
FIG. 4 illustrates a frequency offset Δf versus time during a packet header, e.g. one of the headers of FIGS. 2C and 2D.

In a step 310, the frequency offset between the input signal 110 and the LO signal 115 is removed, e.g. by the frequency recovery block 160. In a sub-step 310a the frequency offset may be determined using the relationship $\Delta f=\Delta\phi(2\pi*T)$, where $\Delta\phi$ is the phase change in radians between consecutive sampling points. Referring to FIG. 4, trace 410 shows the recovered frequency offset, $\Delta f$, during the header for switching from $\lambda_1$ to $\lambda_2$. The frequency offset $\Delta f$ may optionally be averaged over a number of samples, e.g. 256 samples, to filter out noise. Because there is no data modulation before the correlation pattern, the fourth power typically used in QPSK frequency recovery is not needed, thereby increasing the frequency capture range to $\pm 1/(2T)$. The frequency offset $\Delta f$ is expected, in general, to drift due to, e.g., thermal transients in the LO laser following the wavelength switching.

In a sub-step 310b the value of $\Delta f_c$ is predicted in the correlation region. The value may be predicted using, e.g. the relationship $\Delta f_c=\Delta f_2-(\Delta f_1-\Delta f_2)*\Delta t_{c2}/\Delta t_{21}$, where $\Delta f_1$ and $\Delta f_t$ are the frequency offsets in the regions $S_1$ and $S_2$ (FIG. 4), respectively, and $\Delta t_{c2}$ and $\Delta t_{21}$ are the time differences between regions $S_c$ (FIG. 4) and $S_2$, and $S_2$ and $S_1$, respectively. Trace 420 in FIG. 4 shows, in a nonlimiting example, $\Delta f_c$ as a function of time from about 55 ns to about 85 ns.

Figure 5:
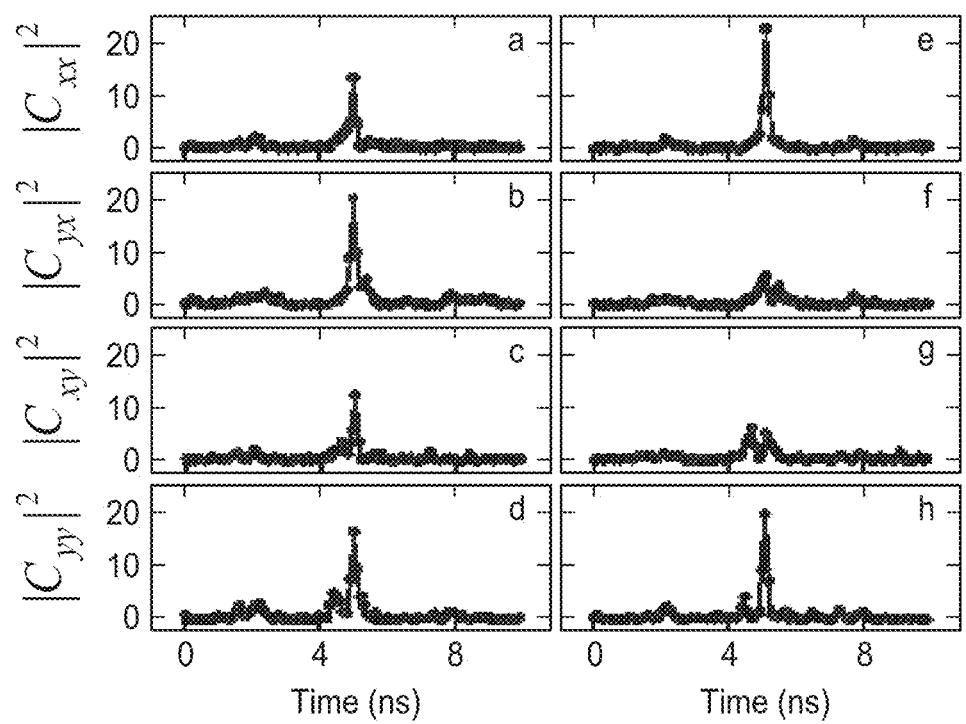
FIG. 5 illustrates magnitudes of the squared cross-correlations before correlation back-rotation of the received optical signal and the local oscillator.

Referring to FIG. 5, two columns are shown the left-hand column including traces 5a-5d, and the right-hand column including traces 5e-5h. Traces 5a-5d show examples of the cross correlations when the optical signal to noise ratio (OSNR), referenced to 0.1 nm, is 8.0 dB. The presence of peaks in the cross terms $C_{yx}$ and $C_{xy}$, presented as $|C_{xy}|^2$ and $|C_{yx}|^2$, indicates mixing of x and y polarization in the transmission link.

Returning to FIG. 3, in a step 320 the correlation values are calculated and the received data are adjusted accordingly, e.g. by the correlation block 165. Thus in a substep 320a, the correlation peaks may be detected by monitoring $C_{xx}$, $C_{xy}$, $C_{yx}$, and $C_{yy}$, for example as the sum of the squared magnitudes of all four correlations. Thus a cross-correlation figure of merit $FOM_{cC}$ may be computed as $$\sum \{|C_{xx}|^2 + |C_{xy}|^2 + |C_{yx}|^2 + |C_{yy}|^2\}$$

as a function of time.

In a substep 320b polarization angles are computed at the peak correlation values. Thus, polarization angle values are calculated as $\theta_x=\arctan(C_{yx}/C_{xx})$, $\theta_y=\arctan(C_{xy}/C_{yy})$, $\phi_x=\arg(C_{xx}/C_{yx})/2$, and $\phi_y=-\arg(C_{yy}/C_{xy})/2$ from the correlation values at the peak position. In a substep 320c the polarization of the received data, e.g. the relative polarization angle between the between the input optical signal 110 and the local oscillator signal 115, is rotated back to its original state by applying the inverse Jones matrix $$J^{-1} = \begin{bmatrix} e^{-i\varphi}\cos\theta & e^{i\varphi}\sin\theta \\ -e^{-i\varphi}\sin\theta & e^{i\varphi}\cos\theta \end{bmatrix},$$

where $\theta=(\theta_x+\theta_y)/2$ and $\phi=(\phi_x+\phi_y)/2$. This step may be performed by the polarization back-rotation block 170. Referring again to FIG. 5, the traces 5e-5h show the correlation values after the back rotation of the received data. The cross terms $|C_{xy}|^2$ and $|C_{yx}|^2$ are substantially reduced and $|C_{xx}|^2$ and $|C_{yy}|^2$ are increased. This result indicates that the alignment of the polarization axes is greater after the back rotation. When the peaks of the $|C_{xy}|^2$ and $|C_{yx}|^2$ are minimized, this condition corresponding to about nil rotation between the received optical signal 110 and the local oscillator signal 115.

Figure 6A:
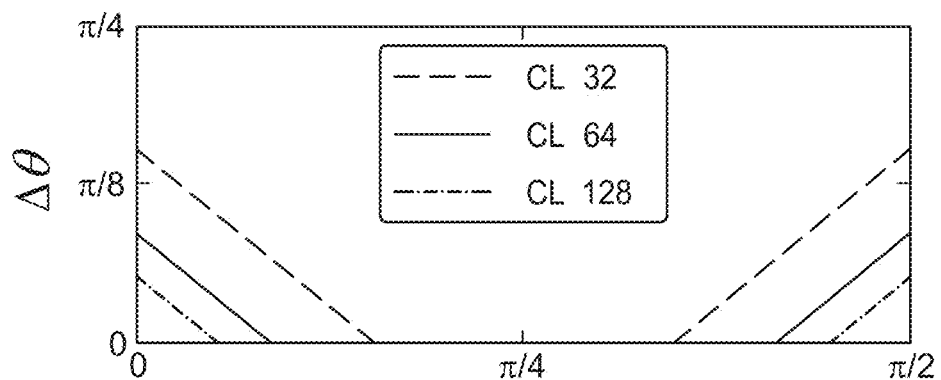
FIG. 6 illustrates calculated errors in the recovered $\phi$ and $\theta$ versus incoming $\theta$ for different lengths of a correlation pattern CL embedded in the received optical data stream.
Figure 6B:
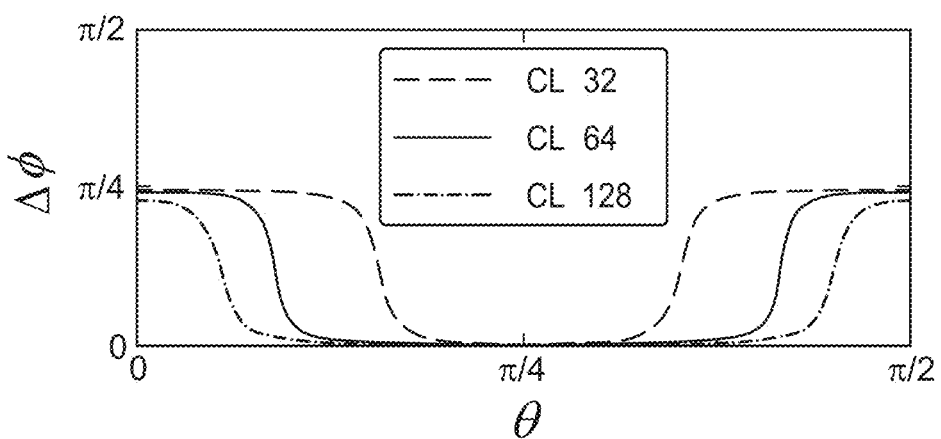

FIGS. 6a and 6b present results that demonstrate the accuracy of the method 300 in simulated operation of the system 100. FIGS. 6a/6b respectively illustrate $\Delta\theta$ and $\Delta\theta$ as a function of $\theta$. The values of $\Delta\theta$ and $\Delta\phi$ denote maximum deviations of the recovered angles from the actual values. The maximum deviations were obtained after calculating 360 different values of $\phi$ at each $\theta$. As the length of the correlation pattern, CL, increases, the accuracy of the recovered angles improves. Note that the accuracy is best at about $\theta=\pi/4$, as this is the region where the polarizations are the most strongly mixed and all four correlations show distinct peaks. As $\theta$ approaches 0 or $\pi/2$, two of the four correlations become too small to be accurately measured in the presence of the correlation noise, but since there is less polarization mixing in these regions, the accuracy is not as important.

Returning again to FIG. 3, after the polarization back rotation, a two-polarization CMA is used, e.g. in the CMA block 175, to set the coefficients of a filter employed to recover data encoded on the input signal 110, e.g. a butterfly filter with four 9-tap T/2 finite impulse response (FIR) filters. The butterfly filter may be implemented by the CMA block 175. For the remainder of the packet, the offset frequency and phase are tracked using the Viterbi-Viterbi algorithm, e.g. by the frequency/phase tracking block 180, and bit errors are counted on the PRBS payload.

Figure 7:
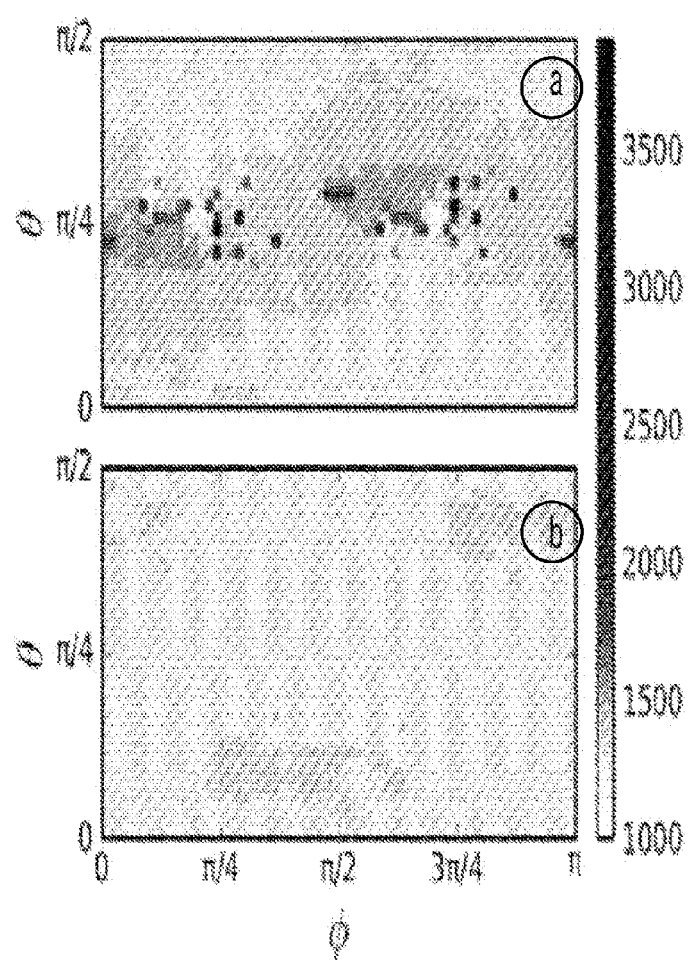
FIGS. 7A and 7B illustrate the number of symbols received via the input optical signal of FIG. 1 before the bit error rate (BER) of the recovered data falls below $10^{-3}$ in a planar space defined by $\phi$ and $\theta$ without correlation back-rotation (FIG. 7A) and with correlation back-rotation (FIG. 7B)

FIGS. 7A/B illustrate a measure of the result of implementing the method 300, according to a nonlimiting example. Each of these figures shows the number of symbols after the beginning of the CMA for which the bit error ratio (BER) falls below $10^3$ for different θ and φ when the OSNR is, e.g. 9 dB. A lower number of symbols represents better performance. FIG. 7a illustrates the case for which the polarization back rotation from the correlations is not applied, so that polarization separation is provided by the CMA algorithm only. In FIG. 7B the correlation back rotation is implemented so that the polarizations are separated before the CMA starts. It is seen that the performance represented by FIG. 7b, for which the back rotation is applied before CMA, is generally superior. For example, the maximum number of symbols for the BER to be below $10^{-3}$ is reduced from 3840 symbols without the correlation back rotation (FIG. 7a) to 1440 symbols with the correlation back rotation (FIG. 7b). Furthermore, it is believed that the correlation back rotation guarantees that the same bit sequence will not be recovered on both x and y outputs of the digital receiver.

Figure 8:
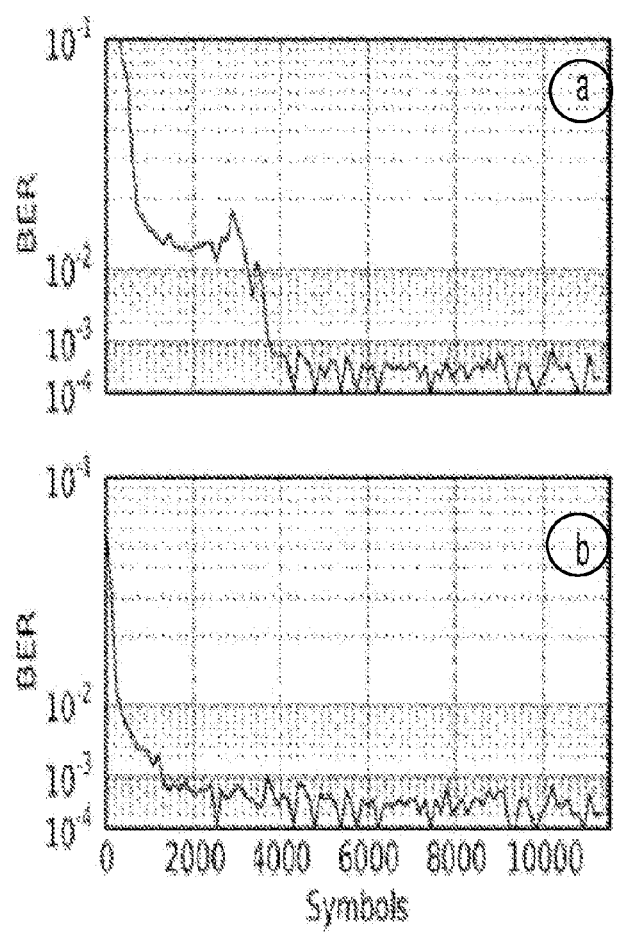
FIGS. 8A and 8B illustrate BER versus number of symbols after the correlation pattern without correlation back-rotation (FIG. 8A) and with correlation back-rotation (FIG. 8B).

FIGS. 8A/B illustrate settling time for the CMA for the examples of, respectively, FIG. 7A (no back rotation) and FIG. 7B (back rotation), for an average BER for these example conditions. For the case of no back rotation, the CMA settles, on average, after about 4000 received symbols, while with back rotation applied the CMA is settled, on average, by about 1000 received symbols. Thus, again by this measure the method 300 provides significantly improved performance of the CMA.

The functions of the various elements shown in the FIGS. 1 and 3, including any functional blocks labeled as "processors", may be provided through the use of dedicated hardware, such as an application specific integrated circuit (ASIC), as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. An apparatus, comprising:
    an optical front end configured to coherently receive an input optical signal and convert the input optical signal to a digital-electrical data stream; and
    a receiver processor configured to:
        recover a data stream from the digital-electrical data stream; and
        cross-correlate first and second received complex correlation patterns with first and second pre-determined correlation patterns; and
        determine, from the comparison, coefficients of a filter configured to recover data encoded on the input digital-electrical data stream.

2. The apparatus of claim 1, wherein the filter is configured to recover DP-QPSK modulated data from the digital-electrical signal.

3. The apparatus of claim 1, wherein:
    the optical front end comprises an optical hybrid configured to receive an input optical signal and a local oscillator signal and to produce a plurality of optical output signals corresponding to in-phase and quadrature components of the input optical signal;
    a plurality of optical detectors are each configured to convert a corresponding one of the optical output signals to a corresponding electrical signal; and
    a plurality of analog-to-digital converters are configured to produce, from the outputs of the optical detectors, the digital-electrical data stream including the in-phase and quadrature components.

4. The apparatus of claim 3, wherein the local oscillator signal is configured to switch between first and second wavelengths.

5. The apparatus of claim 3, wherein the receiver processor is further configured to reduce a relative polarization angle between the input optical signal and the local oscillator signal by reducing a measure of cross-correlation between a received correlation pattern corresponding to a first polarization channel of the input optical signal bandwidth and a predetermined correlation pattern corresponding to a second polarization channel of the input optical signal.

6. The apparatus of claim 3, wherein the first and second pre-determined correlation patterns correspond to about nil rotation between a polarization channel of the received optical signal and a corresponding polarization of the local oscillator.

7. The apparatus of claim 3, wherein the receiver processor is further configured to separate two polarization data channels received via the input optical signal.

8. The apparatus of claim 3, wherein the receiver processor is further configured to reduce an offset frequency between the input optical signal and the local oscillator prior to the cross-correlation.

9. The apparatus of claim 8, wherein the receiver processor is further configured to reduce the offset frequency by determining the offset frequency, between data packets conveyed by the input optical signal, during a header period during which the input optical signal is unmodulated.

10. A method, comprising:
    configuring a receiver processor of an optical coherent receiver to:
        recover a data stream from an input digital-electrical data stream;
        cross-correlate first and second received complex correlation patterns with first and second pre-determined correlation patterns; and determine, from the correlation, coefficients of a filter configured to recover data encoded on the input digital-electrical data stream.

11. The method of claim 10, further comprising configuring the filter to recover DP-QPSK modulated data from the digital-electrical signal.

12. The method of claim 10, further comprising:
configuring an optical hybrid to receive an input optical signal and a local oscillator signal and to produce a plurality of optical output signals corresponding to in-phase and quadrature components of the input optical signal;
configuring each optical detector of a plurality of optical detectors to convert a corresponding one of the output signals to a corresponding electrical signal; and
configuring a plurality of analog-to-digital converters to produce, from the outputs of the optical detectors, the digital-electrical data stream including the in-phase and quadrature components.

13. The method of claim 12, wherein the local oscillator signal is configured to switch between first and second wavelengths.

14. The method of claim 12, wherein the receiver processor is further configured to reduce a relative polarization angle between the input optical signal and the local oscillator signal by reducing a measure of cross-correlation between a received correlation pattern corresponding to a first polarization channel of the input optical signal bandwidth and a predetermined correlation pattern corresponding to a second polarization channel of the input optical signal.

15. The method of claim 12, wherein the correlation includes wherein the first and second pre-determined correlation patterns correspond to about nil rotation between a polarization channel of the received optical signal and a corresponding polarization of the local oscillator.

16. The method of claim 12, wherein the receiver processor is further configured to separate two polarization data channels received via the input optical signal.

17. The method of claim 12, wherein the receiver processor is further configured to reduce an offset frequency between the input optical signal and the local oscillator prior to the cross-correlation.

18. The method of claim 17, wherein the receiver processor is further configured to reduce the offset frequency by determining the offset frequency, between data packets conveyed by the input optical signal, during a header period during which the input optical signal is unmodulated.

* * * * *